(12) United States Patent
Zhi et al.

(10) Patent No.: US 8,433,514 B1
(45) Date of Patent: Apr. 30, 2013

(54) NAVIGATION SENSOR MOUNTING-ANGLE CALIBRATION

(75) Inventors: Xiaorong Zhi, Fremont, CA (US); Peter Van Wyck Loomis, Sunnyvale, CA (US)

(73) Assignee: Trimble Navigation, Limited, Sunnyvale, CA (US)

( * ) Notice: Subject to any disclaimer, the term of this patent is extended or adjusted under 35 U.S.C. 154(b) by 0 days.

(21) Appl. No.: 13/474,050

(22) Filed: May 17, 2012

(51) Int. Cl.
*G01S 1/00* (2006.01)
(52) U.S. Cl.
USPC .......................................................... 701/472
(58) Field of Classification Search .................. 701/472, 701/409, 532, 1, 446, 50, 533; 342/357.59
See application file for complete search history.

(56) References Cited

U.S. PATENT DOCUMENTS

| | | | | |
|---|---|---|---|---|
| 2011/0125404 | A1* | 5/2011 | Czompo | 701/216 |
| 2011/0238308 | A1* | 9/2011 | Miller et al. | 701/216 |
| 2011/0288728 | A1* | 11/2011 | Ruizenaar | 701/41 |

\* cited by examiner

*Primary Examiner* — Thomas Black
*Assistant Examiner* — Robert Payne
(74) *Attorney, Agent, or Firm* — NUPAT, LLC; Morrison Ulman

(57) ABSTRACT

Dead reckoning navigation sensors based on 3-axis gyroscopes and methods for calibrating sensor module orientation are described for three scenarios: (1) known mounting angles, (2) unknown, arbitrary mounting angles, and (3) unknown, but restricted mounting angles.

9 Claims, 5 Drawing Sheets

NAVIGATION SENSOR MOUNTING-ANGLE CALIBRATION

TECHNICAL FIELD

The disclosure is related to mounting-angle calibration techniques for navigation sensors.

BACKGROUND

Dead reckoning measurements from inertial sensors improve satellite derived position and velocity estimates. A car navigation system that combines GNSS and inertial measurements, e.g. using Kalman filtering, can provide acceptable accuracy during GNSS signal reception outages, especially when map-matching techniques are used for vehicles assumed to travel on roads. (Global navigational satellite systems (GNSS) include the Global Positioning System (GPS), GLONASS, Beidou/Compass, and Galileo.)

For car navigation, yaw rate and wheel tachometer measurements may be used to propagate position and velocity estimates between GNSS fixes. However, for such systems to work well the axis of the yaw rate gyro must be aligned with the vertical axis of the vehicle it is mounted in; otherwise, accuracy suffers. Conventional systems are based on single-axis yaw rate gyros.

Even when advanced manufacturing techniques are employed, it is not always possible to specify the relevant mounting angles to a designer of dead reckoning modules. A module that is used in several different vehicle models, for example, may be mounted in a different orientation in each.

Hence, what is needed is a dead reckoning module for car navigation that can be mounted in various orientations without compromising the accuracy of gyro angular rate measurements.

DETAILED DESCRIPTION

Dead reckoning navigation sensors and techniques for calibrating their orientation within a vehicle are now described. The sensors are based on 3-axis rate gyroscopes and three mounting scenarios are considered: (1) known mounting angles, (2) unknown, arbitrary mounting angles, and (3) unknown, but restricted mounting angles.

A 3-axis gyroscope can be used to measure angular rate about an axis of arbitrary orientation. When mounting angles are known, a coordinate transformation may be used to synthesize a yaw gyro. When mounting angles are unknown, a self-calibration procedure may be used to orient the gyroscope. Inexpensive MEMS 3-axis gyroscopes make this approach possible.

A middle ground exists between the cases of known and unknown mounting angles. In some cases, a dead reckoning sensor may be mounted in one of several known orientations; i.e. the mounting angles are not known in advance, but the possibilities are limited. An example is a sensor that may be mounted in only two orientations, $\pi$ radians apart; e.g. upright or upside down. When only a small set of mounting angles is possible, self-calibration need only be accurate enough to choose the correct orientation. The possible mounting orientations are represented by "profiles" and may be stored in memory associated with a dead reckoning sensor.

Figure 1:
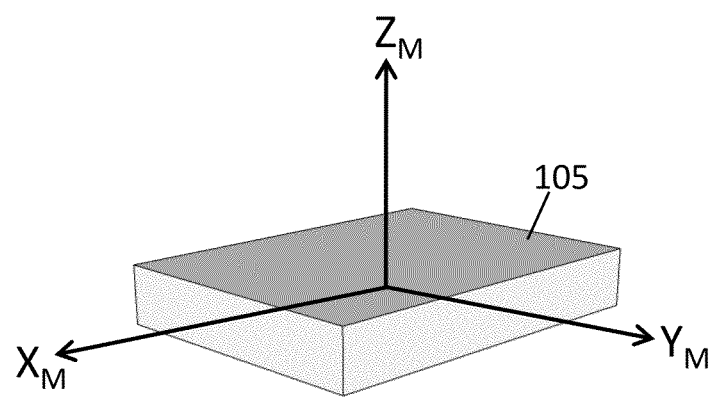
FIG. 1 shows a dead reckoning module and a set of orthogonal axes associated with it.

Turning now to the drawings, FIG. 1 shows dead reckoning module 105 and a set of orthogonal axes associated with it. The axes of the module are labeled "$X_M$", "$Y_M$", and "$Z_M$". The dead reckoning module contains a 3-axis rate gyroscope that provides angular rates around the module's X, Y and Z axes.

Figure 2:
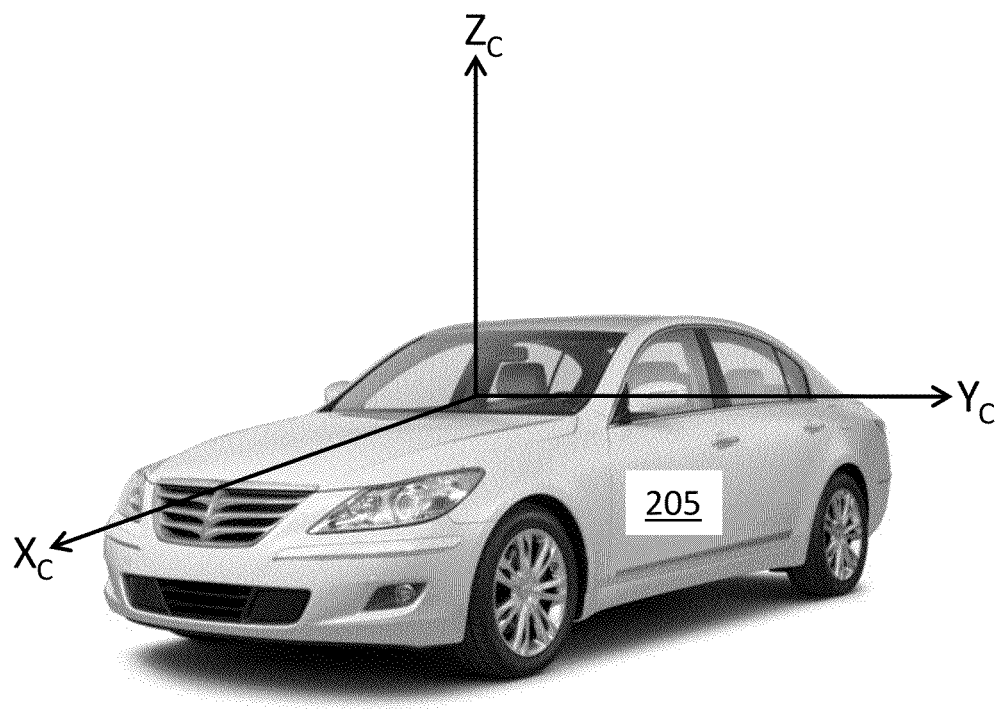
FIG. 2 shows a car and a set of orthogonal axes associated with it.

FIG. 2 shows car 205 and a set of orthogonal axes associated with it. The axes of the car are labeled "$X_C$", "$Y_C$", and "$Z_C$". Rotation around the car's X-axis is called roll, rotation around the Y-axis is called pitch, and rotation around the Z-axis is called yaw. Making accurate car yaw measurements with a dead reckoning module depends on knowing the relative orientation of the module and the car.

When mounting angles are known, angular rate data in the car coordinate system may be computed in terms of the module's 3-axis gyro outputs according to the coordinate transformation:

$$\begin{bmatrix} V_X \\ V_Y \\ V_Z \end{bmatrix} = \begin{bmatrix} \cos\alpha\cos\beta & \cos\alpha\sin\beta\sin\gamma - \sin\alpha\cos\gamma & \cos\alpha\sin\beta\cos\gamma + \sin\alpha\sin\gamma \\ \sin\alpha\cos\beta & \sin\alpha\sin\beta\sin\gamma + \cos\alpha\cos\gamma & \sin\alpha\sin\beta\cos\gamma - \cos\alpha\sin\gamma \\ -\sin\beta & \cos\beta\sin\gamma & \cos\beta\cos\gamma \end{bmatrix} \begin{bmatrix} A_X \\ A_Y \\ A_Z \end{bmatrix}$$

Here, $\alpha$, $\beta$ and $\gamma$ are counterclockwise rotation angles of module 105 around car 205 axes $Z_C$, $Y_C$, $X_C$ respectively. $\gamma$ rotation is performed first, then $\beta$ rotation, and $\alpha$ rotation last. $A_X$, $A_Y$ and $A_Z$ are the angular rates around $X_M$, $Y_M$ and $Z_M$ axes, respectively, as measured by a 3-axis gyroscope contained in module 105. $V_X$, $V_Y$ and $V_Z$ are angular rates around the car's $X_C$, $Y_C$ and $Z_C$ axes. The car's yaw rate, $V_Z$, may be expressed as:

$$V_Z = \hat{u} \cdot \vec{A}$$

where $$\hat{u} = [-\sin\beta \quad \cos\beta\sin\gamma \quad \cos\beta\cos\gamma]$$

is a unit vector and $\vec{A} = [A_X \, A_Y \, A_Z]$. $\hat{u}$ may be calculated as function of mounting angles $\alpha$, $\beta$ and $\gamma$ and then stored in memory. Angular rate data from all three axes of dead reckoning module 105 are obtained and car yaw rate $V_Z$ is then calculated.

Figure 3:
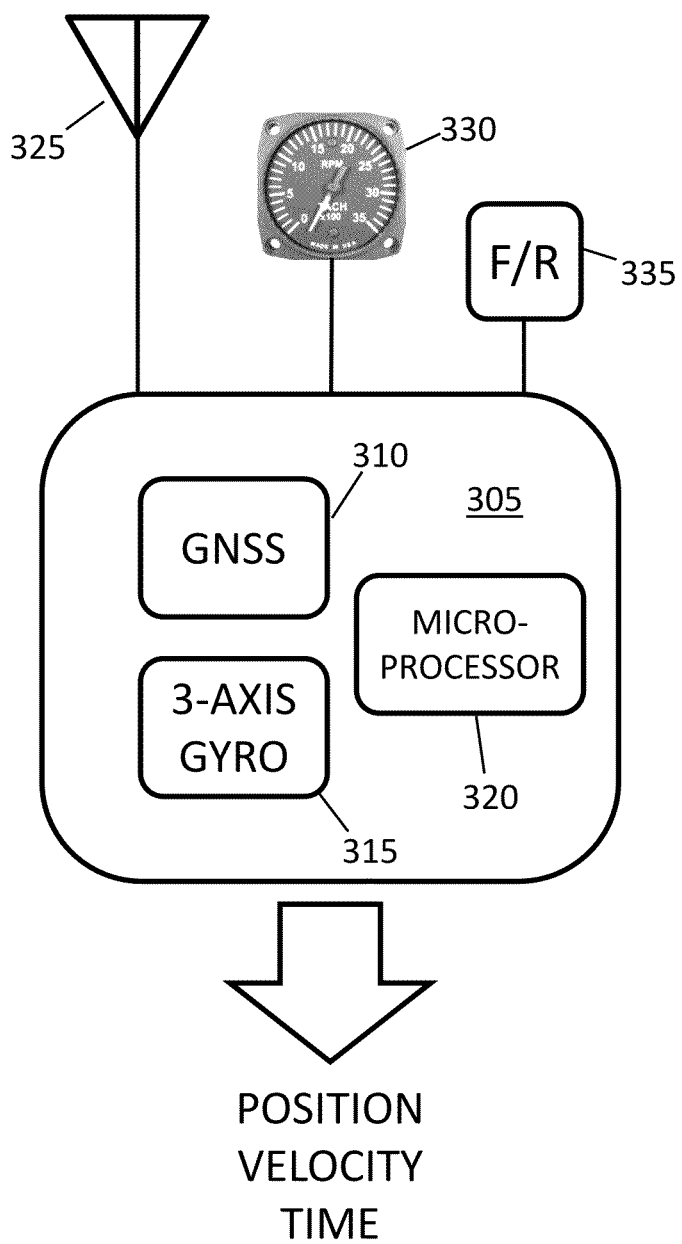
FIG. 3 is a block diagram of a dead reckoning module and various attached sensors.

When mounting angles are unknown, a self-calibration procedure may be used to orient a dead-reckoning module with respect to a car. Gyro biases are estimated when the car is not moving. A series of turns made on flat ground are used to find a unit vector $\hat{w}$ such that $V_Z = \hat{w} \cdot \vec{A}$. Unit vector $\hat{w}$ represents the direction of the vehicle's yaw axis as measured in the gyroscope's coordinate system The self-calibration procedure does not depend on accelerometer measurements so no accelerometer need be present in the dead reckoning module. FIG. 3 is a block diagram of a typical dead reckoning module and various attached sensors. In FIG. 3, module 305 includes GNSS receiver 310, 3-axis rate gyro 315 and microprocessor 320. Microprocessor 320 includes memory (e.g. flash memory) which may or may not be part of the same chip. Module 305 receives GNSS signals from antenna 325 and vehicle wheel rotation rate information from tachometer 330. Forward/reverse switch 335 provides a signal that indicates whether the vehicle is moving forward or backward. The output of the dead reckoning module is an estimate of position, velocity and time. The estimate is based on GNSS, yaw rate, wheel tachometer and forward/reverse information, and may be updated several times per second.

The first step in a self-calibration procedure is measurement of gyroscope biases. This is done by measuring gyro output (i.e. $\vec{A}$) when the vehicle in which a dead reckoning module is mounted is not moving. Once biases are known, unit vector $\hat{w}$ may be found by driving a vehicle along a calibration path including a series of turns on a flat surface.

Several left and right turns along the calibration path provide adequate averaging of results. The yaw rate during the turns must high enough to make the effects of gyroscope yaw rate noise insignificant. (Yaw rate noise is the amplitude of random yaw rate fluctuations reported by a gyroscope not in motion.) Heading information obtained from GNSS measurements is used to distinguish left and right turns. Full stops before turns are useful for gyro bias calibration. Driving on a flat surface ensures that gyro rate data represent pure yaw motion.

Figure 4:
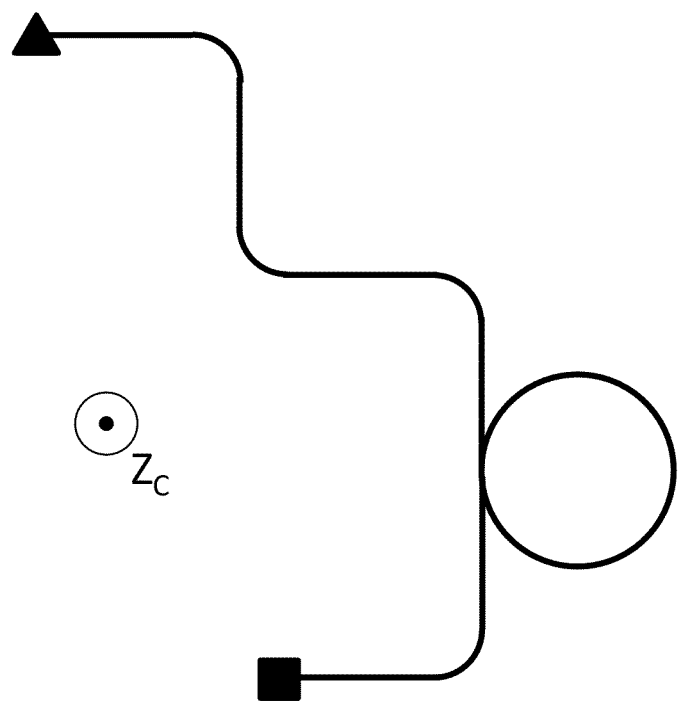
FIG. 4 shows an example calibration path.

FIG. 4 shows an example calibration path. The path starts at the triangle, ends at the square and includes several turns. The bull's-eye marked $Z_C$ indicates that the vertical axis of a vehicle on the path is perpendicular to the plane of the figure. A vehicle following the path may stop before turns to facilitate bias calibration. Of course, an infinite variety of similar calibration paths exists sharing the common features of including several turns and remaining in a plane.

After recording gyro data along a calibration path, unit vector $\hat{w}$ is given by:

$$\hat{w} = \pm \frac{1}{|\tilde{A}|} [\tilde{A}_X \quad \tilde{A}_Y \quad \tilde{A}_Z]$$

where tilde represents averaged gyro measurements after correction for bias and $|\tilde{A}|$ represents the length of $\tilde{A}$. The plus sign applies in left turns while the minus applies in right turns as determined by GNSS derived headings. The car's yaw rate, $V_Z$, may then be expressed as: $V_Z = \hat{w} \cdot \vec{A}$ where $\vec{A} = [A_X \; A_Y \; A_Z]$.

When only a restricted set of mounting orientations is possible, self-calibration need only be accurate enough to choose the correct orientation. The possible orientations are called "profiles" and may be stored in memory; e.g. memory associated with microprocessor 320. A unit vector $\hat{p}_i$ may be associated with mounting angles $\alpha_i$, $\beta_i$ and $\gamma_i$ in the ith mounting profile:

$$\hat{p}_i = [-\sin \beta_i \; \cos \beta_i \sin \gamma_i \; \cos \beta_i \cos \gamma_i]$$

Profile mounting angles $\alpha_i$, $\beta_i$ and $\gamma_i$ are counterclockwise rotations around car axes $Z_C$, $Y_C$, $X_C$ respectively. $\gamma$ rotation is performed first, then $\beta$ rotation, and $\alpha$ rotation last.

Figure 5A:
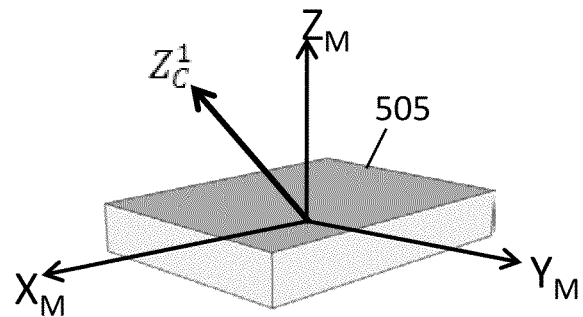
FIGS. 5A-5C illustrate mounting profiles and alignment of a dead reckoning module.
Figure 5B:
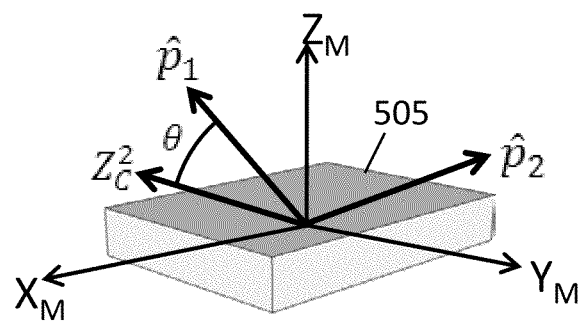
Figure 5C:
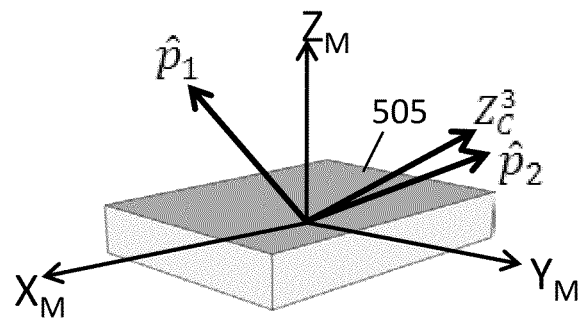

FIGS. 5A-5C illustrate mounting profiles and alignment of dead reckoning module 505. In FIG. 5A, $Z_C^1$, indicates the direction of the $Z_C$ axis of a car in which the module is mounted. Similarly, in FIG. 5B, $Z_C^2$, indicates the direction of the $Z_C$ axis of the car, and in FIG. 5C, $Z_C^3$, indicates the direction of the $Z_C$ axis of the car. Thus FIGS. 5A-5C show module 505 in three different orientations with respect to the car. The axes of the module are labeled $X_M$, $Y_M$ and $Z_M$.

Mounting profiles represent possible orientations for mounting a dead reckoning module. Two such profiles are identified by unit vectors $\hat{p}_1$ and $\hat{p}_2$ as shown in FIGS. 5B and 5C. These profiles might represent orientations of a dead reckoning module in a base model and deluxe version of a car, for example.

In FIG. 5B, the module is oriented closer to the profile associated with unit vector $\hat{p}_1$ than to that associated with unit vector $\hat{p}_2$. The car's Z axis, $Z_C^2$, has been discovered by the self-calibration procedure described above; i.e. $\hat{Z}_C^2 = \hat{w}$. ($\hat{Z}_C^2$ is a unit vector pointing in the same direction as $Z_C^2$.) The profile that most closely matches the mounting orientation of a module is the one for which $\hat{w} \cdot \hat{p}_i$ is greatest. (The angle, $\theta$ in FIG. 5B, between the car's Z axis and the mounting profile is given by $\hat{w} \cdot \hat{p} = \cos \theta$.)

In FIG. 5C, the module is oriented very close to the profile associated with unit vector $\hat{p}_2$. As in FIG. 5B, in FIG. 5C, the car's Z axis, $Z_C^3$, has been discovered by self-calibration procedure; i.e. $\hat{Z}_C^3 = \hat{w}$. In this case $\hat{w} \cdot \hat{p} \approx 1$ because the angle between the profile and the car's z-axis is small.

Once a mounting profile has been chosen, the yaw rate of the vehicle may be estimated according to $V_Z = \hat{p} \cdot \vec{A}$. However, in some cases it may be desirable to only use a profile in place of a self-calibrated orientation when the mismatch between the two is smaller than a critical value, e.g. $\theta < \pi/10$. Equivalently, it may be desirable to only assume a nearest profile represents the actual module orientation when $\hat{w} \cdot \hat{p}_i$ is greater than a critical value, e.g. $\hat{w} \cdot \hat{p} > 0.95$. Thus, the yaw rate, $V_Z$, of the vehicle may be estimated according to $V_Z = \hat{p} \cdot \vec{A}$ if the dot product $\hat{w} \cdot \hat{p}$ exceeds a critical value and according to $V_Z = \hat{w} \cdot \vec{A}$ otherwise.

In conclusion, dead reckoning navigation sensors based on 3-axis gyroscopes and methods for calibrating sensor module orientation have been described for three scenarios: (1) known mounting angles, (2) unknown, arbitrary mounting angles, and (3) unknown, but restricted mounting angles.

Although the description above has used the term "car", clearly the techniques and devices described are applicable to any kind of land vehicle including cars, trucks, buses, railroad cars, heavy construction equipment, etc. Hence "car" and "vehicle" are used interchangeably in the description.

The above description of the disclosed embodiments is provided to enable any person skilled in the art to make or use the invention. Various modifications to these embodiments will be readily apparent to those skilled in the art, and the principles defined herein may be applied to other embodiments without departing from the scope of the disclosure. Thus, the disclosure is not intended to be limited to the embodiments shown herein but is to be accorded the widest scope consistent with the principles and novel features disclosed herein.

What is claimed is:

1. A method for measuring the yaw rate of a vehicle comprising:

mounting a 3-axis rate gyroscope in the vehicle, axes of the gyroscope inclined with respect to pitch, roll and yaw axes of the vehicle by a set of unknown mounting angles;

measuring rotation rate outputs, $\vec{A}$, of the 3-axis rate gyroscope while the vehicle is not moving to estimate gyroscope biases;

measuring rotation rate outputs, $\vec{A}$, of the 3-axis rate gyroscope while the vehicle moves along a calibration path including a series of turns on a flat surface to estimate a unit vector $\hat{w}$, the unit vector representing the direction of the vehicle's yaw axis in terms of the gyroscope axes; and, estimating the yaw rate, $V_Z$, of the vehicle according to
$V_Z = \hat{w} \cdot \vec{A}$.

2. The method of claim 1 where unit vector $\hat{w}$ is estimated from a set of averaged gyroscope measurements, $\tilde{A}$, according to $$\hat{w} = \pm \frac{1}{|\tilde{A}|} [\tilde{A}_X \quad \tilde{A}_Y \quad \tilde{A}_Z],$$

the averaged measurements obtained after correction for biases and the sign of $\hat{w}$ estimated according to GNSS measurements of heading changes while $\tilde{A}$ are obtained.

3. A method for measuring the yaw rate of a vehicle comprising:

mounting a 3-axis rate gyroscope in the vehicle, axes of the gyroscope inclined with respect to pitch, roll and yaw axes of the vehicle by a set of unknown mounting angles;

measuring rotation rate outputs, $\vec{A}$, of the 3-axis rate gyroscope while the vehicle is not moving to estimate gyroscope biases;

measuring rotation rate outputs, $\vec{A}$, of the 3-axis rate gyroscope while the vehicle moves along a calibration path including a series of turns on a flat surface to estimate a unit vector $\hat{w}$, the unit vector representing the direction of the vehicle's yaw axis in terms of the gyroscope axes; and, choosing a mounting profile characterized by a unit vector, $\hat{p}$, from among two or more such profiles, according to whichever profile maximizes the dot product $\hat{w} \cdot \hat{p}$; and, estimating the yaw rate, $V_Z$, of the vehicle according to $V_Z = \hat{p} \cdot \vec{A}$.

4. The method of claim 3 where unit vector $\hat{w}$ is estimated from a set of averaged gyroscope measurements, $\tilde{A}$, according to $$\hat{w} = \pm \frac{1}{|\tilde{A}|} [\tilde{A}_X \quad \tilde{A}_Y \quad \tilde{A}_Z],$$

the averaged measurements obtained after correction for biases and the sign of $\hat{w}$ estimated according to GNSS measurements of heading changes while $\tilde{A}$ are obtained.

5. The method of claim 3 further comprising:

estimating the yaw rate, $V_Z$, of the vehicle according to $V_Z = \hat{p} \cdot \vec{A}$ if the dot product $\hat{w} \cdot \hat{p}$ exceeds a critical value and according to $V_Z = \hat{w} \cdot \vec{A}$ otherwise.

6. A dead reckoning module comprising:

a 3-axis rate gyroscope and a GNSS receiver both in communication with a microprocessor, the microprocessor having memory and input ports for receiving wheel tachometer data and forward/reverse switch data, wherein two or more module mounting profiles are stored in the memory, the mounting profiles expressing the direction of a vehicle's yaw axis in terms of the gyroscope axes as a unit vector, $\hat{p}$, such that the yaw rate, $V_Z$, of the vehicle may be estimated according to $V_Z = \hat{p} \cdot \vec{A}$ where $\vec{A}$ represents rotation rate outputs of the gyroscope.

7. The dead reckoning module of claim 6 wherein, further stored in the memory are mounting angles $\alpha$, $\beta$, $\gamma$ associated with unit vector, $\hat{p}$.

8. The dead reckoning module of claim 6 wherein, further stored in the memory are microprocessor instructions for:

measuring rotation rate outputs, $\vec{A}$, of the 3-axis rate gyroscope while the vehicle is not moving to estimate gyroscope biases;

measuring rotation rate outputs, $\vec{A}$, of the 3-axis rate gyroscope while the vehicle moves along a calibration path including a series of turns on a flat surface to estimate a unit vector $\hat{w}$, the unit vector representing the direction of the vehicle's yaw axis in terms of the gyroscope axes; and, choosing a mounting profile characterized by a unit vector, $\hat{p}$, from among two or more such profiles, according to whichever profile maximizes the dot product $\hat{w} \cdot \hat{p}$; and, estimating the yaw rate, $V_Z$, of the vehicle according to $V_Z = \hat{p} \cdot \vec{A}$.

9. The dead reckoning module of claim 8 wherein, further stored in memory are microprocessor instructions for:

estimating the yaw rate, $V_Z$, of the vehicle according to $V_Z = \hat{p} \cdot \vec{A}$ if the dot product $\hat{w} \cdot \hat{p}$ exceeds a critical value and according to $V_Z = \hat{w} \cdot \vec{A}$ otherwise.

* * * * *